April 1, 1941.   F. B. DIESBACH   2,237,281
CAMERA SUPPORTING HEAD
Filed Sept. 27, 1938   2 Sheets-Sheet 2
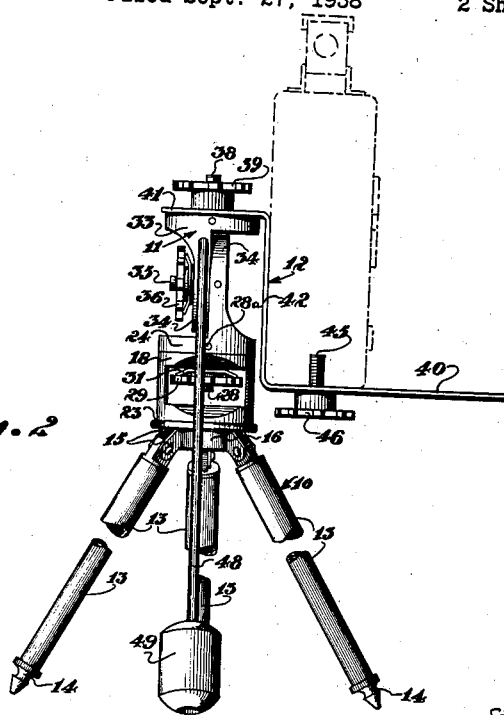
Fig. 2
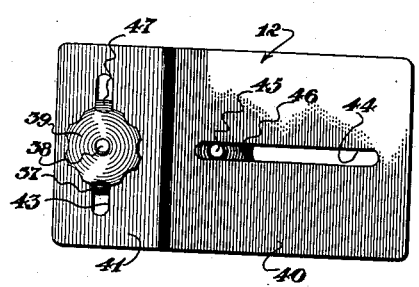
Fig. 3
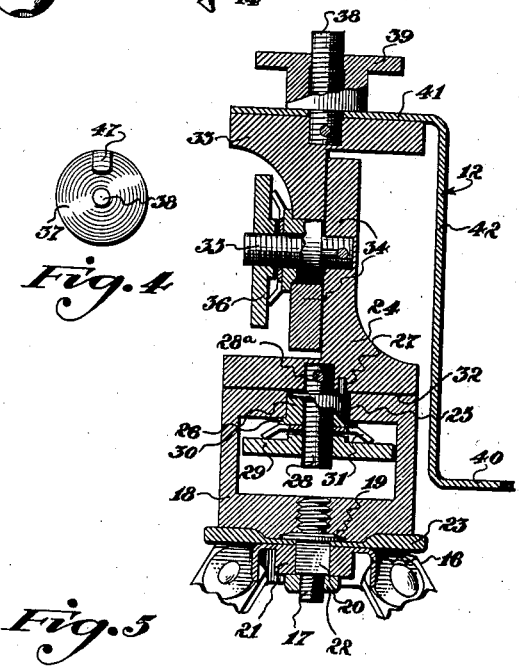
Fig. 4
Fig. 5
INVENTOR.
BY Frederick B. Diesbach
Word & Word
ATTORNEYS Patented Apr. 1, 1941

2,237,281

UNITED STATES PATENT OFFICE 2,237,281

CAMERA SUPPORTING HEAD

Frederick B. Diesbach, Hamilton, Ohio, assignor to Paul Benninghofen and Fritz G. Diesbach, trustees, Hamilton, Ohio Application September 27, 1938, Serial No. 231,937

7 Claims. (Cl. 248—183)

This invention relates to adjustable supporting heads for cameras or the like adapted to be fixed on a stand such as a tripod or the like. The improved head of this invention is designed particularly for amateur or home use in conjunction with motion picture or single exposure cameras but is not limited to this use.

In order to obtain the best results in photography, a stationary support for the camera should be utilized. This is true especially with respect to motion picture cameras or single exposure cameras when a slow shutter speed is employed or when time exposures are made. Under these conditions the camera must be held absolutely stationary, otherwise the effects of camera movement will be evidenced by blurring of the picture or a lack of sharpness. In the operation of motion picture cameras, the effect of unsteadiness is very pronounced when the finished picture is projected upon the screen.

On the other hand, it is often desirable to move or pivot the camera, for instance, in training the camera on a moving object or in making panoramic views. If the movements are smooth and uninterrupted, the effect is pleasing and attractive and the value of the finished picture is greatly enhanced. In pivoting the camera horizontally as exemplified above, it is often desirable to maintain a fixed elevation or, in other words, to move the camera in a level plane horizontally. Thus, in following a horizontally moving object, the camera should be maintained at a fixed elevation.

The present structure permits steady and uniform camera movements either vertically or horizontally. However, in order to provide for movements in one direction only in a fixed plane as outlined above, independently movable sections are provided. Each section has a separate friction joint so that the camera may be pivoted horizontally in a given plane while the vertically movable section is held at the adjusted elevation by the friction joint or vice versa.

It has been an object of the inventor to provide a tripod head of simple inexpensive design having frictionally engaged sections which serve not only to hold the camera at any adjusted angle but also to retard the rate of camera movement and thereby insure a smooth controlled even rate of movement free from irregularity or jerkiness.

It has been another object to provide a tripod head having swivel sections respectively for horizontal and vertical swivelling movements of the camera, each section of which is self holding independently of the other. By this arrangement the camera may be swivelled steadily in a fixed plane, either in the horizontal or the vertical plane or universally. The head is provided with improved friction devices and adjustment means, the setting of which is not disturbed by swivelling of the head.

A further object has been to provide a swivel head structure made up of duplicate interchangeable parts, thus reducing manufacturing costs.

Briefly it is a concept of this invention to provide a support head, which by the provision of improved friction joints and adjustment devices, is highly effective for preventing jerkiness of head movement. The friction joints resist to a moderate degree the movement, so that a relatively uniform smooth rate is produced somewhat similar to the effect produced by a dash pot arrangement.

Furthermore it has been determined that there is less tendency for the camera to tip or to be unsteady on the pivot if the mass center of gravity of the camera is lowered with respect to the pivot of the tripod head. Accordingly, it has been the further object of the invention to provide a bracket or support which mounts the camera in this improved relationship. The concept has taken form, in one respect, in an angular bracket secured to the top of the tripod head and depending to a point well below the top, at which point a flat horizontal surface is provided, upon which the camera is fixed.

By this arrangement, the camera may have its mass center of gravity disposed at or below the pivot. It is of particular importance that the center of the camera may be disposed substantially on the axis of rotation so that the lens, within certain limits, are more nearly the same distance from the subject when the camera is being tilted.

Referring to the drawings illustrating a preferred embodiment of the invention:

Figure 2 illustrates the tripod assembly as viewed from the rear.

Figure 3 is a top plan view of the tripod head illustrating the camera mounting bracket.

Figure 4 is a top plan view of the tripod head with the camera mounting braket removed.

Figure 5 is an enlarged sectional view taken on line 5—5, Figure 1, detailing the structure of the tripod head.

Figure 1:
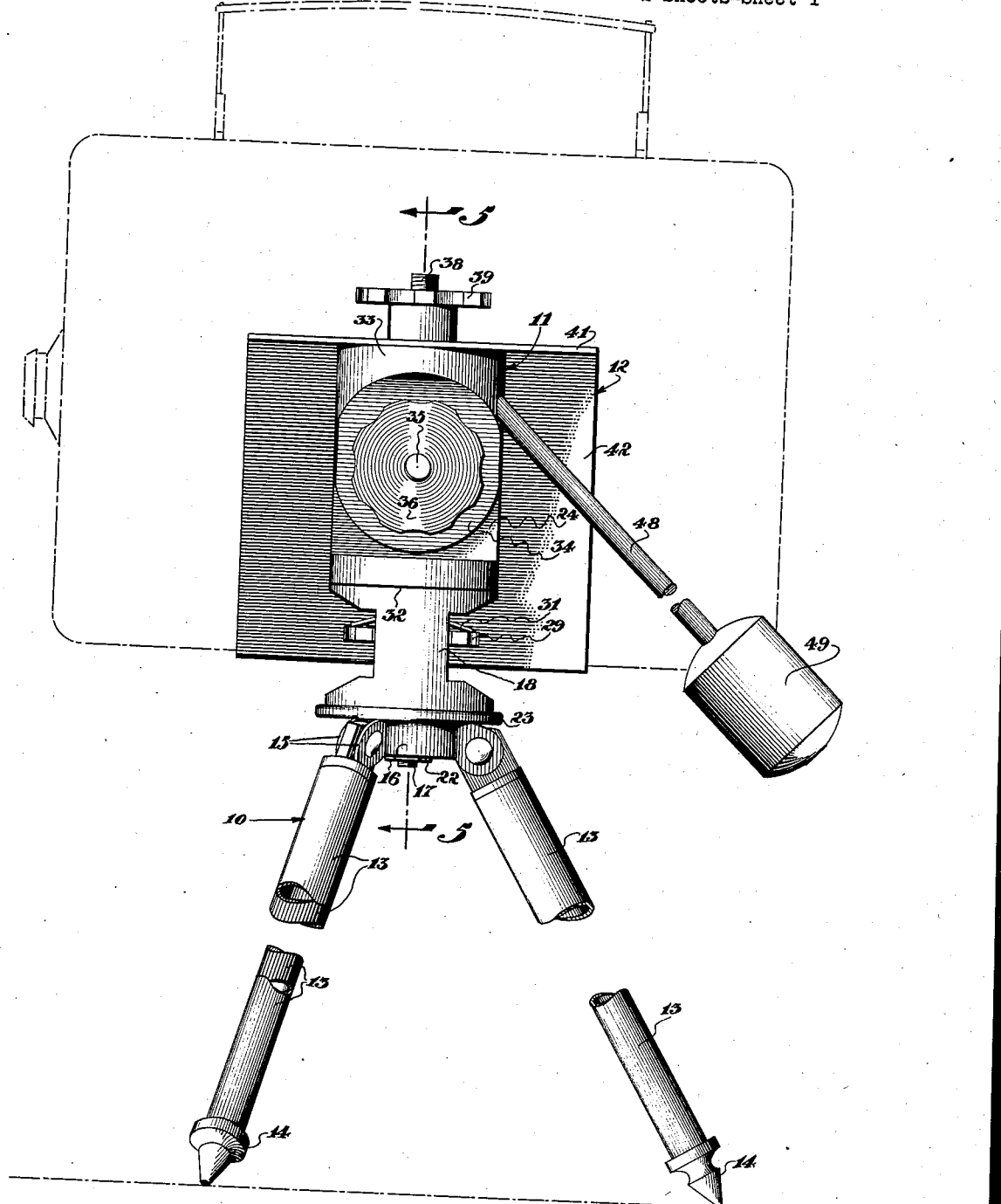
Figure 1 is a fragmentary side view illustrating the tripod in position of use with a camera mounted thereon.

Described in general, the device comprises a tripod assembly 10, a swivel head 11, and a camera mounting bracket 12. The tripod legs consist of slidable sections 13, telescopically interfitted and arranged to be extended or collapsed as desired. The leg sections are frictionally engaged to permit adjustment as to height. The lower ends of the legs are provided with spurs 14 to insure a firm foundation for the tripod. The upper ends of the legs are pivoted and frictionally engaged between respective pairs of ears 15—15, forming a part of the annular support bracket 16, upon which the swivel head is mounted.

The tripod head assembly 11, is secured upon the annular bracket by means of a stud 17, screw-threaded axially into the fixed cylindrical base member 18. The stud includes a flange 19, bearing against the bottom of the base member 18. The stud is tightly screwed into the base member, so as to prevent rotation. The lower portion of the stud includes a squared portion 20 engaged in a squared opening in the boss 21 of the support bracket 16. The extended end of the stud is screw-threaded to receive a nut 22, drawing the base member 18 and the support bracket 16 firmly together. A plate 23 is disposed between the base 18, and the support bracket 16.

The mounting head is comprised essentially of two swivelling elements, a lower element pivoted on a vertical stud and an upper element pivoted upon the lower element on a horzontal stud. The lower element provides for panoramic or horizontal movements, while the upper provides for vertical or elevating movements. The assembly thus permits the camera to be adjusted to any desired angle.

The base member 18, is stationary with respect to the tripod assembly and provides a support for the horizontally rotatable element 24. For this purpose the top flange of the base member includes an axial bore 25, which is the bearing for the bushing 26. The bushing is held against rotation relative to element 24 by means of a pin 27, engaged in the element. The bushing is traversed by a stud 28, screw-threaded into the element 24 and locked in place by means of a pin 28a.

The lower end of the stud includes an adjustment nut 29, in the form of a knob to facilitate operation. The bushing 26, includes a flange 30 in bearing contact with the undersurface of the base member. When the adjustment knob 29, is tightened against the bushing, the flange 30, is frictionally engaged against the base member. Since the bushing is secured to the element 24, the element is locked against rotation.

The adjustment knob 29 provides either, for locking the head rigidly to the tripod base, or for gripping the head with just sufficient friction to hold the head in position and yet to permit swivelling. For this purpose, a spring washer 31, is disposed between the adjustment knob and the bushing, which washer insures that a constant tension is exerted between the base and the swivelling element 24, when the knob is not fully tightened.

In order to insure smoothness of action, an antifriction plate 32 is placed between the flat bearing surface of the base and the element 24. This plate, which may be of brass or fibre, is under pressure between the bearing surfaces. A characteristic of this arrangement is that of providing a smooth drag or turning resistance, and of eliminating undue starting resistance. The arrangement is advantageous in making still pictures as well as motion pictures, since the camera may be swiveled or will remain in set position without readjustment of the friction knobs.

The upper swivelling element 33, as previously indicated, is mounted upon the lower element 24. For this purpose each element is provided with a vertical friction lug 34. These lugs are semicircular and provide cooperating friction surfaces for elevating movements of the camera. The upper element is mounted upon a horizontal stud 35, having a bushing identical to the bushing 26 previously described. A knob 36, screw-threaded on the stud, permits adjustment of the pressure at which the lugs are engaged. The arrangement is substantially the same as that previously described and consequently need not be described in detail.

It is pointed out here that the duplicate construction of the two elements constituting the swivelling head reduces the cost of manufacture considerably. This is true also of the adjustment assemblies, which are duplicates, thus providing for interchangeability of parts and effecting a saving in die and machining costs.

The upper swivel element includes a flat circular top 37, similar to that of the lower element. A vertical stud 38, screw-threaded centrally into the top carries a knob 39. This knob engages an angular fixture or bracket 12, upon which the camera is mounted. The bracket is formed of a plate bent at right angles in opposite directions to provide a horizontal camera supporting platform 40 and an attachment portion 41, joined by an intermediate vertical section 42. A pair of elongated slots 43, and 44, are formed in the plate, to permit shifting of the bracket and the camera. The slot 43, is traversed by the stud 38, thus permitting the bracket to be shifted relative to the head. The slot 44, is traversed by a set screw 45, having a knob 46. This set screw is screw-threaded into the bottom of the camera in the conventional manner to secure the camera to the bracket. The slot 44, therefore, permits the camera to be shifted laterally relative to the bracket and also adapts the bracket to various sizes or types of cameras. In order to hold the fixture in alignment on the top of the swivel element, a lug 47 engages in the slot as shown in Figure 4.

A manipulating lever 48 is extended downwardly and rearwardly from the head. The lever is preferably screw-threaded into the upper swivelling element and includes a hand grip or knob 49 at the outer end.

The camera may be pointed in any direction by swinging the lever and sighting through the finder of the camera to get the desired object in view. The adjustment knobs, for this purpose, should be set to exert sufficient pressure to frictionally hold the camera at the adjusted position and, at the same time, should not be tight enough to interfere with freedom of action. In operating a motion picture camera, the camera may be swung about while running, as is sometimes practiced in taking panoramic pictures or pictures of moving objects. The arrangement of the friction surfaces insures against jerkiness and tends to produce a smooth and uniform rate of movement.

If the camera is to be pivoted in one plane only, for instance, in a horizontal plane at a given elevation, it may be tilted to the necessary elevation and then pivoted horizontally in a straight line. This is accomplished without any change in the setting of the adjustment knobs. Due to the construction of the head, the two planes of movement are independently governed by frictional resistances.

It will be noted that the angular camera mounting fixture or bracket 12 extends downwardly considerably below the horizontal axis of the swivel head. This disposes the center line of the camera substantially on the horizontal axis of the swivel head. The purpose of lowering the camera in this manner is to lower the mass center of gravity relative to the head. In other words, the weight of the camera is not shifted appreciably when elevating adjustments are made as would otherwise occur were the camera mounted above the axis of the head. The lateral attachment slot at the top of the fixture facilitates the balancing of the camera by permitting the fixture to be shifted forwardly or rearwardly as needed. By establishing proper balance, in this manner, the upper adjustment knob need not be set as tightly to hold the camera at the selected angle as would otherwise be necessary. In addition, the distance between the camera and the subject remains unchanged when the camera is tilted, due to the location of the pivotal axis relative to the center of the camera. This is of advantage chiefly in taking portraits or close-ups in which the subject is close to the camera and shifting of the camera would materially change the focus.

It will be apparent from the structure of the swivel head that the camera is always disposed in a vertical plane regardless of angle it assumes longitudinally.

The bushing 26 is fixed to the element 24 by means of the pin 27. The screw 28 on which the bushing is mounted is also fixed to the rotatable element 24. Accordingly, after the adjustment knob 29 is rotated to the desired position for establishing the appropriate friction between the rotative and non-rotative elements there is no chance for accidental slippage as the head is swivelled. It will be noted that the bushing is the only contact element lying against the fixed element 18 and it cannot rotate relative to the swivelling element 24 nor can the spring plate 31 or the adjustment knob rotate since they are carried by the bushing and the screw.

Having described my invention I claim:

1. A camera supporting head for use on a tripod or the like, comprising a fixed element, a camera supporting element adjustably mounted on the fixed element, and a camera supporting bracket adjustably fixed to said adjustable element and depending therefrom, said bracket including a flat horizontal flange disposed below the point of adjustment of the bracket for supporting the camera with the mass center of gravity of the camera lowered with respect to the point of adjustment of the adjustable member.

2. A camera supporting head, comprising a fixed element, a camera supporting element adjustably mounted on the fixed element, and a camera supporting bracket fixed to said adjustable member and depending therefrom, said bracket including a depending flange for supporting the camera, with the mass center of gravity of the camera lowered with respect to the point of attachment of the bracket, said bracket including means for holding the bracket in adjusted positions and for attaching the camera at various positions on said flange.

3. A camera supporting head, comprising a fixed support, a rotatable member mounted on said fixed support on a vertical axis, a second rotatable member mounted on said first rotatable member on a horizontal axis, adjustable friction means between said first named rotatable member and said fixed support, adjustable friction means between said second named rotatable member and said first named rotatable member, and means for mounting a camera on said second rotatable member, said means including a support ledge for the camera below said horizontal axis.

4. A camera supporting head for use on a tripod or the like, comprising a fixed element, a camera supporting element mounted for movement in vertical and horizontal planes on the fixed element and, a camera supporting bracket adjustably fixed to the said camera supporting element and depending therefrom said bracket including a flat horizontal portion disposed below the point of adjustment of the bracket for supporting the camera with the mass center of gravity of the camera lowered with respect to the point of attachment of the bracket.

5. A camera supporting means for use on a tripod or the like, comprising, an adjustably mounted element and a supporting element mounted on said adjustable element, said supporting element including a flange, upon which the camera is adapted to be mounted, said flange disposed below the point of attachment of the bracket to the adjustable element, whereby the camera is lowered with respect to the point of attachment.

6. A camera supporting means, comprising, an adjustable element adapted to be mounted on a tripod, a support plate fixed on said element and including a vertical wall depending from the attached portion and a horizontal ledge extending outwardly from the lower edge of the vertical wall, and means whereby a camera may be fixed on said horizontal ledge and against said vertical wall.

7. A supporting head, comprising, a fixed base, a member rotatably mounted on said fixed base, an instrument supporting member mounted on said first-named member, a screw fixed to the rotatable member and constituting the axis of rotation for the rotatable member, a bushing on said screw fixed to said rotatable member, said bushing lying about the screw and having a flange overhanging and engaging the fixed base, a knob engaged on said screw, and a spring plate interposed between the knob and the flange of the bushing for forcing the bushing against the fixed base and causing a frictional fit between said rotatable member and the base, whereby all of the parts, except the base, rotate as a unit.

FREDERICK B. DIESBACH.